(12) United States Patent
Park

(10) Patent No.: US 6,191,393 B1
(45) Date of Patent: Feb. 20, 2001

(54) COOKING UTENSIL AND MANUFACTURING METHOD THEREFOR

(76) Inventor: Jong Do Peter Park, 2484 Sundial Dr., Unit B, Chino Hills, CA (US) 91749

( * ) Notice: Under 35 U.S.C. 154(b), the term of this patent shall be extended for 0 days.

(21) Appl. No.: 09/449,693

(22) Filed: Nov. 23, 1999

Related U.S. Application Data

(60) Provisional application No. 60/116,149, filed on Jan. 16, 1999, and provisional application No. 60/119,492, filed on Feb. 10, 1999.

(51) Int. Cl.⁷ .................. B65D 6/28; B65D 8/04; A47J 36/02; A47J 27/00
(52) U.S. Cl. .................. 219/439; 219/436; 220/619
(58) Field of Search .................. 219/436, 430, 219/439, 540, 530; 99/330; 220/619, 689; 126/375

(56) References Cited

U.S. PATENT DOCUMENTS

| | | |
|---|---|---|
| 1,093,648 | 4/1914 | Potter . |
| 2,969,452 * | 1/1961 | Geller et al. .................. 219/436 |
| 3,724,711 | 4/1973 | George et al. .................. 220/63 |
| 3,736,893 * | 6/1973 | Coppens et al. .................. 220/619 |
| 3,745,290 | 7/1973 | Harnden, Jr. et al. .................. 219/10.49 |
| 3,934,748 | 1/1976 | Racz .................. 220/9 |
| 4,063,068 * | 12/1977 | Johnson et al. .................. 219/439 |
| 4,138,606 * | 2/1979 | Brown .................. 219/436 |
| 4,595,120 | 6/1986 | Logan et al. .................. 220/469 |
| 4,629,866 * | 12/1986 | Proctor .................. 219/439 |
| 4,667,085 * | 5/1987 | Remmel et al. .................. 219/439 |
| 4,705,184 * | 11/1987 | Tsukamura .................. 220/619 |
| 4,847,459 | 7/1989 | Desai .................. 219/10.55 |
| 4,971,215 * | 11/1990 | Santoni .................. 220/619 |
| 5,012,947 | 5/1991 | Roland .................. 220/428 |
| 5,125,393 | 6/1992 | Levitin .................. 126/373 |
| 5,143,504 * | 9/1992 | Braakman .................. 413/6 |
| 5,228,384 | 7/1993 | Kolosowski .................. 99/342 |
| 5,507,220 | 4/1996 | Jung .................. 99/403 |
| 5,579,946 | 12/1996 | Rowan et al. .................. 220/420 |
| 5,644,976 | 7/1997 | Muchin et al. .................. 99/422 |
| 5,716,537 * | 2/1998 | Talge, III et al. .................. 219/436 |

FOREIGN PATENT DOCUMENTS 97-018816 7/1997 (KR) .

* cited by examiner

*Primary Examiner*—Joseph Pelham
(74) *Attorney, Agent, or Firm*—Lee & Hong

(57) ABSTRACT

The present invention relates to a cooking utensil having a double-layered structure which preserves heat efficiently as well as provides even heat distribution and to a method of fabricating such cooking utensil. The cooking utensil has a heat conduction medium charged between outer and inner shells forming a double-layered structure which is sealed by a curling machine without the use of a built-in safety valve in the wall of the cooking utensil. The method comprises the steps of placing upright the outer shell on a concaved mold, the outer shell having a flange, placing a predetermined amount of the heat conductive medium into a space defined by the outer shell placed on the first mold, placing upright the inner shell in the outer shell so that the heat conductive medium at least partially surrounds the inner shell, forming a rolled joint by curling the flanges of the outer and inner shells together a predetermined number of times to prevent the heat conductive medium from being discharging from the space even when the cooking utensil is exposed to heat. The curling of the flanges of the outer and inner shells is carried out by placing at least one curling roller against the flanges while rotating the outer and inner shells with respect to the curling roller.

23 Claims, 4 Drawing Sheets

COOKING UTENSIL AND MANUFACTURING METHOD THEREFOR

CROSS REFERENCE TO RELATED ART

This application claims the benefit of U.S. Provisional Patent Application Ser. Nos. 60/116,149 filed on Jan. 16, 1999 and Ser. No. 60/119,492, filed on Feb. 10, 1999, which are hereby incorporated by reference in their entirety. This application also incorporates by reference a co-pending patent application Ser. No. 09/449,156 filed on the same day bearing U.S. Express Mail No. EK179574315US.

BACKGROUND OF THE INVENTION

1. Field of the Invention

The present invention relates to a cooking utensil, and particularly, to a cooking utensil which preserves heat entrapped during cooking by having a double-layered wall structure and a method of fabricating such cooking utensil.

2. Discussion of the Related Art

Various types of cooking utensil are known and used in a kitchen. Such cooking utensil is made of one or more layers of stainless steel and has a single layer bottom. The single layer bottom is good for directly transmitting heat to the food contained in the utensil, but also causes burning of the food when carefully not attended to.

To solve the above problems, a cooking utensil having a double-layered structure has been proposed for preventing burnt food and to improve food flavor. One of such ideas is published in Korean Utility Laid-Open Publication No. 85-7307 which teaches that paraffin is injected between a space provided by a double-layered structure and an air-hole is established thereon. Instead of charging the space with paraffin, a structure into which a fluid of heat-medium is injected and sealed is disclosed in Korean Laid-Open Publication No. 97-4035. Moreover, a pot of a double-layered structure and a pot having a double-layered structure into which a working fluid is injected are taught by Japanese Laid-Open Publication No. 56-169825.

In such pots having the above-mentioned structures of the related arts, the gaps between the double-layered structure are filled with heat media to provide even-heat distribution and to save heat energy. Unfortunately, the structures of the related arts are first formed prior to injecting or filling the space formed betweeen walls with heat conductive substances. Thereafter, the outer wall is sealed or a valve is securely placed to prevent the heat conductive substances from leaking out. Such process increases manufacturing cost and decreases production yield.

The roaster of a double-layered structure, into which a heat conductive substance is injected according to the related art, generates high pressure due to internal expansion. To release the pressure safely, the roaster of the related art uses the method of installing a pressure control valve, establishing an inner shell of which shape is easily modified in accordance with the pressure, or reducing the pressure by forming a weak portion on an inner shell.

When the pressure control valve is embodied, the structure and the manufacturing process of the roaster become complicated as well as it is inconvenient to use the roaster due to the pressure control valve. Moreover, forming a weak inner shell reduces the life-span of the roaster. Also, the method of manufacturing a cooking utensil of a double-layered structure by depositing a space between the layers with a heat conduction medium and by sealing a deposit hole is troublesome and generates a leakage of the heat conduction medium due to the weak joint around the deposit hole. As a result, there is still no satisfactory method of sealing the heat conduction medium between the shells.

SUMMARY OF THE INVENTION

Accordingly, the present invention is directed to a roaster and a manufacturing method thereof that substantially obviate one or more of the problems due to limitations and disadvantages of the related art.

The object of the present invention is to provide a roaster and a manufacturing method thereof which preserves heat efficiently as well as provides even heat distribution and provides a simple structure and easy to manufacture the same.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a method of manufacturing a cooking utensil having outer and inner shells is described. The outer and inner shells form wall and bottom spaces between the outer and inner shells, wherein the the wall space is formed substantially along the height of the inner shell. The wall and bottom spaces contain at least partially a heat conductive medium. The cooking utensil also includes a heating coil arranged on the bottom of the outer shell for heating the outer shell of the cooking utensil.

The method of manufacturing comprises the steps of placing upright the outer shell on a concaved mold, the outer shell having a flange; placing a predetermined amount of the heat conductive medium into a space defined by the outer shell placed on the first mold; placing upright the inner shell in the outer shell so that the heat conductive medium at least partially surrounds the inner shell, the inner shell having a flange places substantially parallel to the flange of the outer shell; forming a rolled joint by curling the flanges of the outer and inner shells together a predetermined number of times to prevent the heat conductive medium from discharging from the space even when the cooking utensil is exposed to heat. The curling of the flanges of the outer and inner shells is carried out by placing at least one curling roller against the flanges while rotating the outer and inner shells with respect to the curling roller.

After the flanges of the outer and inner shells are curled for the predetermined number of times, the curling roller is pressed against at least one of the concaved and convexed molds to flatened the rolled joint. Preferably, there are two curling roller oppositely arranged to curl the flanges of the outer and inner shells.

In one aspect of the present invention, a convexed mold is placed in a space defined by the inner shell to firmly hold the inner shell with respect to the outer shell. There is also provided a controller connected to the heat coil to control amount and period of heat provided to the cooking utensil.

In another aspect of the present invention, the heat conduction medium is silicon oil. The silicon oil fills the space between the outer and inner shells about 65% by volume. Alternative to the silicon oil, the heat conduction medium may be ambient air.

Using the above described process, a cooking utensil is formed. The cooking utensil comprises an outer shell having an opening; an inner shell disposed inside the outer shell through the opening, forming wall and bottom spaces between the outer and inner shells, wherein the the wall space is formed substantially along the height of the inner shell, wherein the wall and bottom spaces contain at least partially a heat conductive medium; and a heating coil arranged on the bottom of the outer shell for heating the outer shell of the cooking utensil.

The cooking utensil includes a built-in controller arranged on outside of the outer shell and connected to the heat coil to control amount and period of heat provided to the cooking utensil. Moreover, a remote controller is provided which has a probe being coupled to the heat coil. The remote controller and the built-in controller are preferably electrically connected to exchange data signals with respect to each other.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and, together with the description, serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

Figure 1:
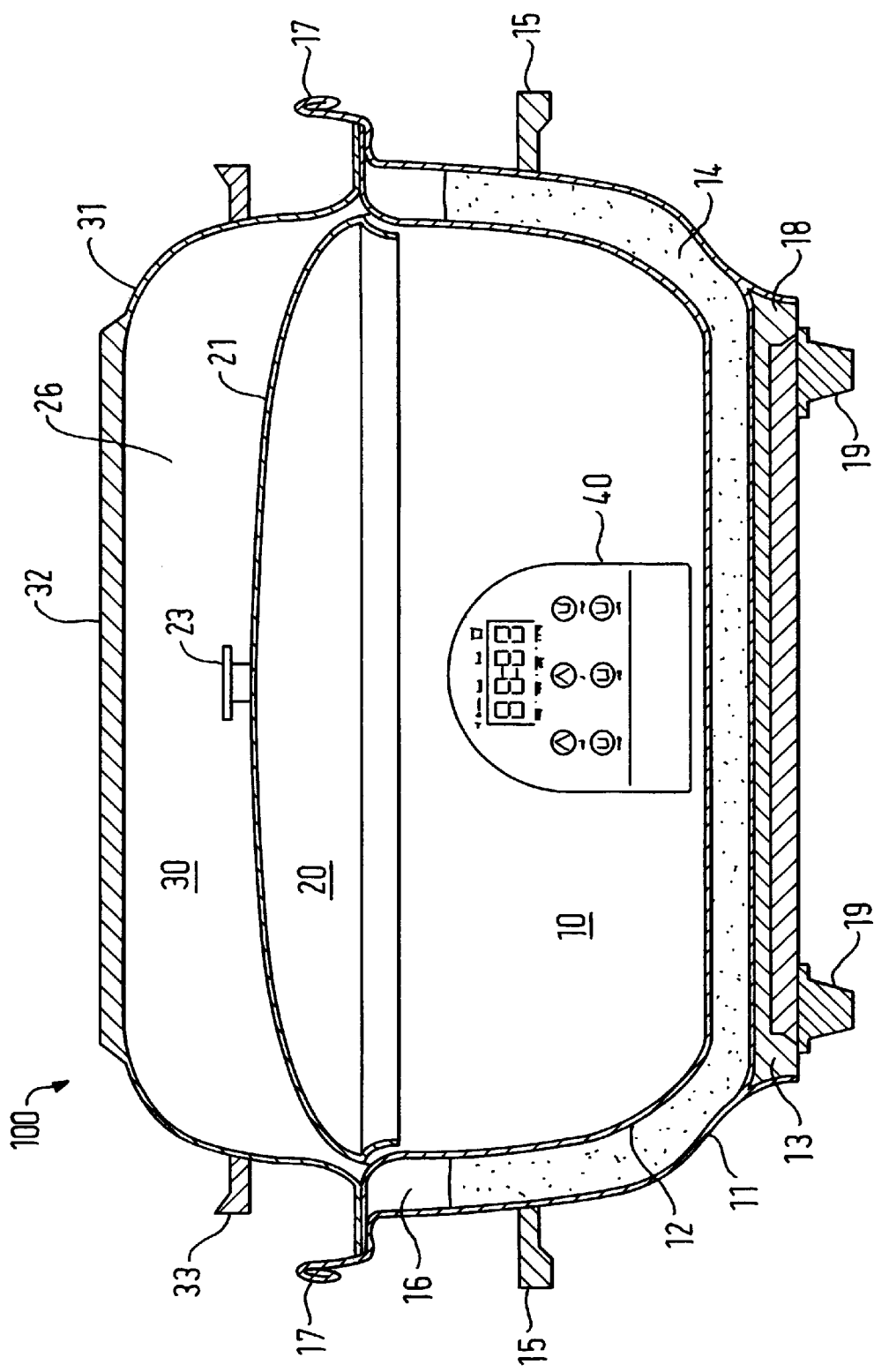
FIG. 1 illustrates a cross-sectional view of a double-layered roaster according to the present invention.

FIG. 1 is a cross-sectional view of the cooking utensil 100 according to a preferred embodiment of the present invention. The cooking utensil 100 generally comprises a body 10 for receiving and cooking food contained therein, an inner lid 20 for substantially covering the body 10 and a thermal insulating cover 30 disposed above the inner lid 20 and covering the opening of the body 10. In particular, the body 10 has a double-layered structure according to the present invention.

According to the preferred embodiment, the inner lid 20 is constructed with a dome-shaped disk 21 of which the edge is snugly fitted in the body 10. Preferably, the disk 21 is made to form a slightly convexed surface with respect to the body 10 of the cooking utensil 100.

The disk 21 of the inner lid 20 is preferrably made of tempered glass of approximately 4 mm thick. Alternatively, the disk 21 may be made of stainless steel, alumunium, aluminum alloy or other suitable materials known to one of ordinary skill in the art.

A handle 23 is attached to the center of the dome-shaped disk 21 by, for example, piercing the central portion of the disk 21. Alternatively, the handle 23 may be affixed to the disk 21 by using adhesives or other fasteners.

The thermal insulating cover 30 is preferably made of a stainless steel plate 31 being about 0.5 to 0.7 mm thick, and preferably about 0.6 mm thick, and has a dome-like figure. The insulating cover 30 and the inner lid 20 form a horizontal air gap 26 which acts as an insulating layer to trap and hold heated air. As a result, once the heat source is removed or disconnected from the cooking utensil 100, the air gap 26 and the vertical space 16 filled with ambient air insulate the inner shell 12 from outside and reduce heat loss, thus keeping the food contained in the inner shell 12 warmer for a longer period of time. Alternative to a single sheet structure, the cover 30 may comprise a plurality of layers of stainless steel and/or aluminum for increased durability and preservation of heat.

In the thermal insulating cover 30, a handle knob 33 is attached to the side walls of the thermal insulating cover 30. The thermal insulating cover 30 also includes a cover disk 32 that is attached to the cover 30 by brazing or other suitabl process known to one of ordinary skill in the art. The cover disk 32 is preferably made of aluminum and is about 3 mm thick.

The body 10 of the cooking utensil 100 according to the present invention includes an outer shell 11 and an inner shell 12 disposed substantially adjacent the outer shell 11. Edges or flanges of the outer and inner shells 11 and 12 are preferably rolled together to form a rolled joint 17. As a result, a vertical space 16 filled with an air pocket is provided between the outer and inner shells 11 and 12. The air pockets are sealed and are not in fluid communication with outside air. The vertical space 16 filled with air is preferably filled with ambient air during the manufacturing process. In the preferred embodiment, the distance between the outer and inner shells 11 and 12 are approximately 15 to 25 mm, and preferably about 20 mm. Preferably, the outer and inner shells 11 and 12 are made of such materials as AISI304 stainless steel that has a thickness of about 0.6 mm. Alternatively, instead of using a single-layered stainless steel, a multiple-layered composite materials may be used. Typically, three or more layered stainless steel or combination of stainless copper and steel are preferred.

In the preferred embodiment, the vertical space 16 is at least partially filled with a heat conduction medium 14, such as silicon oil or other suitable materials known to one of ordinary skill in the art. In particular, the vertical space 16 is filled with silicon oil up to about 55 to 90% by volume. Preferably, the silicon oil is filled up to about 65% of the vertical space 16 to accommodate for the expansion of silicon oil when exposed to heat. For example, while cooking, the pressure of the vertical space 16 varies from 200 mmAG to 600 mmAG. Alternative to silicon oil, the entire space 16 may be filled with ambient air.

In the preferred embodiment of the present invention, the flanges of both the outer and inner shells 11 and 12 are jointly rolled about 4 to 8 times, and preferably 7 times, to form the rolled joint 17. The tightly rolled joint 17 prevents the air or silicon oil contained in the vertical space 16 from escaping even when the cooking utensil 100 is subjected to intense heat. The unique structure of the rolled joint 17 combined with the thickess of the walls of the outer and inner shells 11 and 12 allow the cooking untensil 100 to be used without any air escape valves built into the wall of the body 10 to prevent the cooking utensil against possible explosion.

Further referring to FIG. 1, there is provided a heat conduction plate 18 placed under the outer shell 11. The heat conduction plate 18 is preferably made of a casting aluminum, copper or other suitable materials known to one of ordinary skill in the art. The heat conduction plate 18 is preferably flushly affixed to the bottom of the outer shell 11. The heat conduction plate 18 is about 3 to 6 mm thick, and preferably about 3.5 mm thick.

In the preferred embodiment, an electrical heater coil 13 is installed beneath the bottom of the outer shell 11. In particular, the electrical heater coil 13 is integrally formed or casted with the heat conduction plate 18. The conduction plate 18 includes at least one groove laid out to substantial cover the bottom of the outer shell 11. The heater coil 13 is embedded in the groove. The heater coil 13 and the conduction plate 18 are covered with stainless steel by using such method as argon welding, brazing or other suitable processes. The heater coil 13 may be substituted with other suitable heaters known to one of ordinary skill in the art. The electrical heater coil 13 is connected to an electrical controller 50, as shown in FIG. 2, which is used to control the temperature of the heater coil 13.

On a side of the body 10 of the cooking utensil 100, there is provided a controller and display module 40, preferably a remote controller, for controlling the operation of the cooking utensil 100. In addition, there are plurality of legs 9 attached at the bottom of the cooking utensil 100 to separate the heating coil 13 from a kitchen surface.

Figure 2:
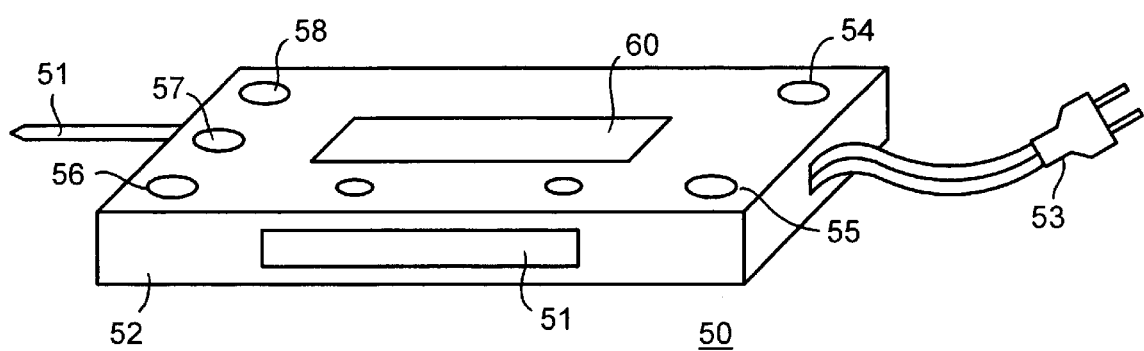
FIG. 2 illustrates a schematic diagram of a thermo controller used in the present invention.

FIG. 2 illustrates a controller 50 used with the cooking utensil 100 illustrated in FIG. 1. The controller 50 is generally plugged into a slot formed in the heat conduction plate 18 in such a way that a probe 51 is in electrical contact with the heater coil 13. According to the present invention, the controller 50 has a temperature sensing bar 51 for detecting the temperature of the electrical heater coil 13, a plug 53 configured to be connected to an electrical outlet and signal line terminals for input and outputting control signals from and to the remote controller 40 affixed to the body 10 of the cooking utensil 100.

Built into the controller 50 are several control switches or buttons. For example, there are temperature-up switch 54, temperature-down switch 55, cooking temperature setting switch 56, timer setting switch 57 and delete switch 58. The controller 50 also includes a liquid crystal display 60 for displaying operating condition and switching settings of the cooking utensil 100. Preferably, the control switches and LCD display are also included in the remote controller 40.

The operation of the preferred embodiment of the present invention is now described. Initially, the power supply plug 53 is connected to a power supply, and the controller 50 is connected to the electrical heater coil 13.

Using either the controller 50 or remote controller 40, the heater coil 13 is energized. The controller 50 provides cooking time, cooking temperature, timer, and the like. Such information is readily displayed on the LCD display provided in the controller 50 and the remote controller 40.

Once the bottom of the cooking utensil 100 is being heated by the heater coil 13, the contents contained in the inner shell 12 is heated by the heat transmitted through the heat conduction plate 18, heat conduction medium 14 and finally the inner shell 12, successively.

Because the heat source generally provides for uneven distribution of heat to a surface, the bottom of the cooking utensil 100 is unevenly heated. However, due to the presence of the heat conduction medium 14, the heat from the heater coil 13 is more evenly distributed to the bottom of the inner shell 12 allowing even distribution of heat to the food contained therein.

The heat conduction medium 14 also serves to heat the vertical walls of the cooking utensil 100. Then the temperature of the air in the space 16 is gradually increased and the heat energy of the air is instantaneously transmitted to the inner shell 12 and spread out throughout the entire wall of the inner shell 12. Therefore, the temperature of the inner shell 12 is substantially constant at any region thereof. In other words, the temperature of the bottom of the inner shell 12 is about the same as that of the cylindrical wall. As a result, not only the food is cooked from the bottom of the inner shell 12, but also from the side walls of the inner shell 12.

The presence of air or silicon oil in the space 16 defined by the outer and inner shells 11 and 12 delays heat transfer between the sides of the outer and inner shells 11 and 12 as well as provides even heat distribution as the heat conducted through the outer shell 11 of the cooking utensil 100 primarily is not transferred to the inner shell 12 of the pot but is partially conveyed through the heat conduction medium.

The heat distributed uniformly in the inner shell 12 heats up the content in the cooking utensil 100. Once heated, the double-layered structure of the cooking utensil 100 according to the present invention maintains the trapped heat, even after the heat source is removed, for a prolonged period. The heat loss thorough the sidewalls of the inner and outer shells 11 and 12 are slowed due to the presence of the heat conduction medium 14.

Moreover, it is easy to preserve the heat inside the cooking utensil 100 as the lid 20 and the thermal insulating cover 30 stop the heat dissipating upward. The third airpocket 26 forced between the lid 20 and the insulating cover 30 traps heat therein and holds the temperature for all extended period of time.

Figure 3:
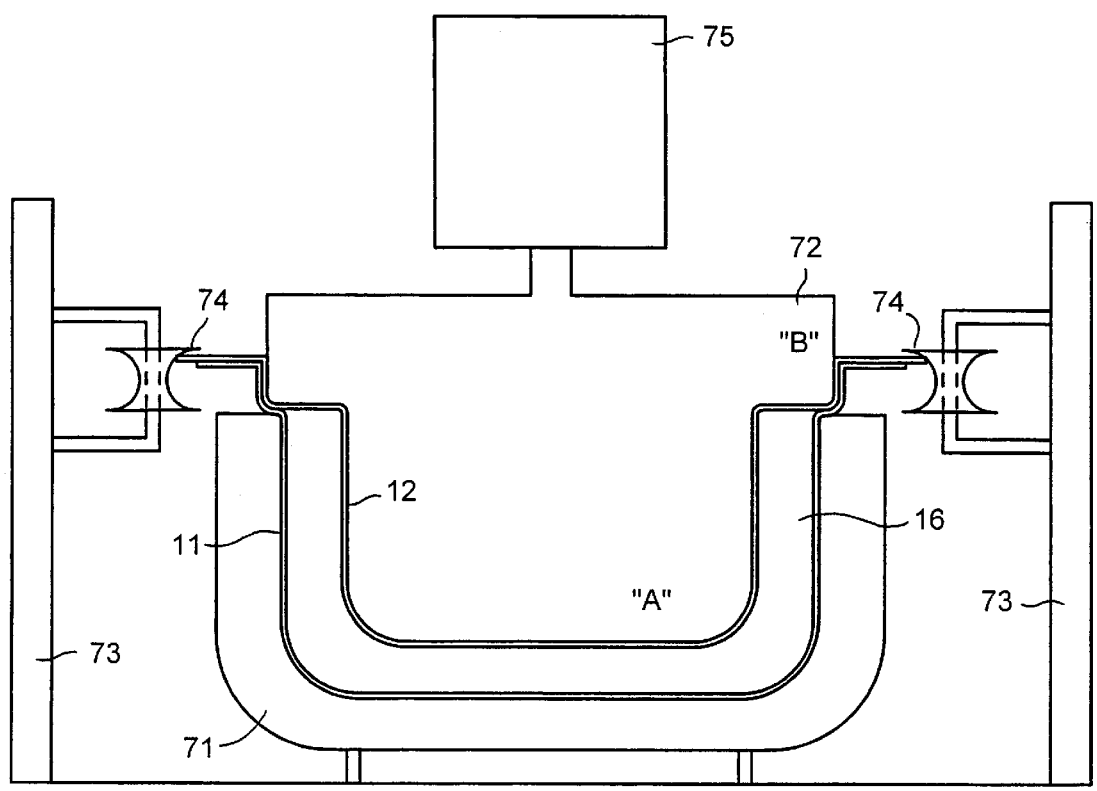
FIG. 3 illustrates a cross-sectional view of the cooking utensil placed in an assembly jig.
Figure 4:
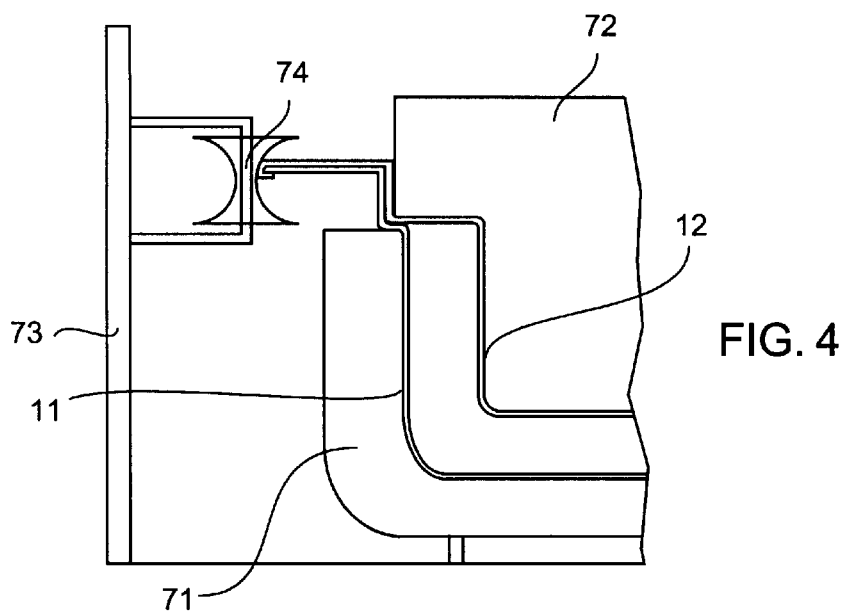
FIGS. 4 to 6 illustrate manufacturing processes for the cooking utensil according to the present invention.
Figure 5:
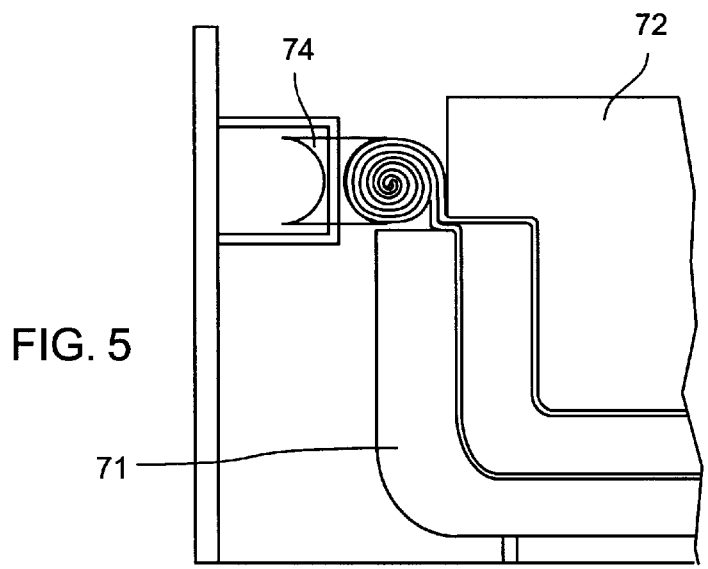
Figure 6:
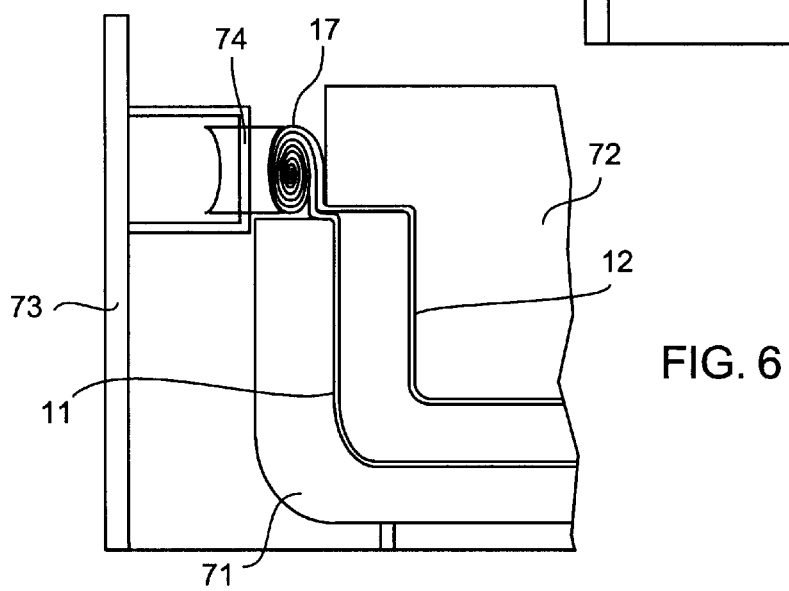

FIG. 3 illustrates a cross-sectional view of the cooking utensil 100 placed in an assembly jig. FIGS. 4 to 6 illustrate manufacturing processes for the cooking utensil according to the present invention.

First, an inner shell 12 and an outer shell 11 which are preferably made of stainless steel having a predetermined strength are prepared so that the inner shell 12 is placed in an opening defined by the outer shell 11. A heat conduction medium 14, such as silicon oil, is then put into the outer shell 11. Then, the inner shell 12 is placed therein to fill up the space between the outer and inner shells 11 and 12 with the heat conduction medium 14 occupying up to 65% by volume of the space 16.

The inner and outer shells 12 and 11, when overlapped, are constructed and designed to provide a vertical and bottom space 16 by being separated from each other at a predetermined distance. Initially, the edges or flanges of the inner and outer shells 12 and 11 are made flat and coplanarly placed for curling. To assist the downward curling of the edges, the edges of the inner shell 12 extends slight farther than that of the outer shell 11, as shown in FIG. 3. Alternatively, if the upward curling is desired, the edges of the outer shell 11 extends farther than that of the inner shell 12.

A first mold 71, preferably made of steel, is fixed to a turn table of a curling machine. The first mold 71 has a concaved groove to which the outer shell 1 is inserted to fit therein. The top flange of the first mold 71 is flat to support the ends of the flanges of the outer and inner shells 11 and 12.

Then, a second mold 72 connected to an hydraulic cylinder is lowered down to be coupled with the inner shell 12 and fastened to the turn table. A convexed part A of the second mold 72, which will be inserted inside the inner shell 12, and a collar B, which abuts against the first mold 71 by pressing against the flanges of the inner and outer shells, are formed in the second mold 72. When the second mold 72 is inserted inside the inner shell 12, the separation distance between the outer and inner shells 11 and 12 becomes substantially uniform.

Referring to FIGS. 4 and 5, the edges of the flanges of the outer and inner shells 11 and 12 are rolled or curled by pressing the edges with cylindrical curling rollers 74 which are coupled to a frame 73 of the curling machine while the first and second molds 71 and 72 are rotating with the outer and inner shells 11 and 12.

The flat flanges are circularly rolled over by pushing the curling roller 73 gradually toward the center. The cross-section of the rolled joint 17 is substantially a circle as shown in FIG. 5. Once the rolled joint has about 4 to 7 rotations, the rollers 74 are pressed further against the side walls of the seocnd mold 72, thereby flatening the rolled joint 17, as shown in FIG. 6.

The advantage of using the molding apparatus described above is that it allows up-right, i.e., opening of the shells facing upward, placement of the cooking utensil, while conventional jigs all allowed upside down placement of the cooking utensil. The up-right placement of the cooking utensil allows the heat conductive medium 14, such as silicon oil, to be deposited without the use of special injection tool. This further eliminates the use of an injection valve typically formed in a side wall of the outer shell 11, which was required when the up-side down placement of cooking utensil was required.

As the heat generated from the electrical heater is transmitted to the food through the heat conduction medium 14 to heat up the bottom and side of the cooking utensil 100 uniformly, the present invention prevents the food from being damaged such as being burnt black or being partially heated. The present invention also retains the original flavor of the food which is cooked fully with the preserved heat.

The present invention provides for a simple and strong structure while allowing easy manufacturing steps without the use of special injection tools since the edges of the inner and outer shells 11 and 12 are sealed completely by curling after the heat conduction medium 14 is filled into the outer shell 11.

It will be apparent to those skilled in the art that various modifications and variations can be made in an oil-core roaster and a manufacturing method thereof of the present invention without departing from the spirit or scope of the inventions. Thus, it is intended that the present invention cover the modifications and variations of this invention provided they come within the scope of the appended claims and equivalents.

What is claimed is:

1. A method of manufacturing a cooking utensil having outer and inner shells forming wall and bottom spaces between the outer and inner shells, the wall space being formed substantially along the height of the inner shell, wherein the wall and bottom spaces contain at least partially a heat conductive medium; and a heating coil arranged on the bottom of the outer shell for heating the outer shell of the cooking utensil, the method comprising the steps of:

placing upright the outer shell on a concaved mold, the outer shell having a flange;

placing a predetermined amount of the heat conductive medium into a space defined by the outer shell placed on the first mold;

placing upright the inner shell in the outer shell so that the heat conductive medium at least partially surrounds the inner shell, the inner shell having a flange placed substantially parallel to the flange of the outer shell, wherein a convexed mold is placed in the inner shell to firmly hold the inner shell with respect to the outer shell;

forming a rolled joint by curling together the flanges of the outer and inner shells a predetermined number of times to prevent the heat conductive medium from being discharged from the space even when the cooking utensil is exposed to heat, wherein the curling of the flanges of the outer and inner shells is carried out by placing at least one curling roller against the flanges while rotating the outer and inner shells with respect to the curling roller, wherein after the flanges of the outer and inner shells are curled for at least four times, the curling roller is pressed against at least one of the concaved and convexed molds to flatten the rolled joint.

2. The method of claim 1, further providing a controller connected to the heat coil to control amount and period of heat provided to the cooking utensil.

3. The method of claim 1, wherein the heat conduction medium is silicon oil.

4. The method of claim 3, wherein the silicon oil fills the space between the outer and inner shells about 65% by volume.

5. The method of claim 1, wherein the heat conduction medium is air.

6. The method of claim 1, further comprising two curling rollers oppositely arranged to curl the flanges of the outer and inner shells.

7. A cooking utensil comprising:

an outer shell having an opening for receiving therein another shell, the outer shell being absent of an injection hole for injecting a heat conductive medium;

an inner shell disposed inside the outer shell through the opening, forming wall and bottom spaces between the outer and inner shells, wherein the the wall space is formed substantially along the height of the inner shell, wherein the wall and bottom spaces contain at least partially the heat conductive medium;

a heat conduction plate affixed under the outer shell; and a heating coil arranged on the bottom of the outer shell and integrally embedded in the heat conduction plate for heating the outer shell of the cooking utensil.

8. The cooking utensil of claim 7, wherein the heat conduction medium is silicon oil.

9. The cooking utensil of claim 8, wherein the silicon oil fills the space between the outer and inner shells about 55 to 90% by volume.

10. The cooking utensil of claim 9, wherein the silicon oil fills the space between the outer and inner shells about 65% by volume.

11. The cooking utensil of claim 7, wherein the heat conduction medium is air.

12. The cooking utensil of claim 7, further comprising an inner lid that fits over a flange of the inner shell to substantially cover an opening defined by the inner shell.

13. The cooking utensil of claim 7, further comprising a cover that fits over a flange of the inner shell to substantially cover an opening defined by the inner shell.

14. The cooking utensil of claim 7, further including a built-in controller arranged on outside of the outer shell and connected to the heating coil to control amount and period of heat provided to the cooking utensil.

15. The cooking utensil of claim 14, further including a remote controller having a probe being coupled to the heating coil, wherein the remote controller and the built-in controller are electrically connected to exchange data signals with respect to each other.

16. The cooking utensil of claim 10, further comprising an inner lid that fits over a flange of the inner shell to substantially cover an opening defined by the inner shell.

17. The cooking utensil of claim 10, further comprising a cover that fits over a flange of the inner shell to substantially cover an opening defined by the inner shell.

18. The cooking utensil of claim 10, further including a built-in controller arranged on outside of the outer shell and connected to the heating coil to control amount and period of heat provided to the cooking utensil.

19. A cooking utensil comprising:
an outer shell having a flange and an opening for receiving therein another shell, the outer shell being absent of an injection hole for injecting a heat conductive medium therethrough;
an inner shell having a flange and being disposed inside the outer shell through the opening, forming wall and bottom spaces between the outer and inner shells, wherein the the wall space is formed substantially along the height of the inner shell, wherein the wall and bottom spaces contain at least partially the heat conductive medium, and the flanges of the outer and inner shells are curled at least four times and pressed to form a rolled joint; and
a heating coil arranged on the bottom of the outer shell for heating the outer shell of the cooking utensil.

20. The cooking utensil of claim 19, further comprising a heat conduction plate affixed under the outer shell.

21. The cooking utensil of claim 20, wherein the heating coil is embedded in the heat conduction plate.

22. The cooking utensil of claim 19, wherein the heat conduction medium is silicon oil.

23. The cooking utensil of claim 19, wherein the heat conduction medium is air.

* * * * *